(12) United States Patent
Kisielewicz

(10) Patent No.: US 11,131,382 B2
(45) Date of Patent: Sep. 28, 2021

(54) PARK LOCK ARRANGEMENT AND VEHICLE COMPRISING SUCH A PARK LOCK ARRANGEMENT

(71) Applicant: Volvo Car Corporation, Gothenburg (SE)

(72) Inventor: Rafal Kisielewicz, Olofstorp (SE)

(73) Assignee: Volvo Car Corporation, Gothenburg (SE)

( * ) Notice: Subject to any disclaimer, the term of this patent is extended or adjusted under 35 U.S.C. 154(b) by 79 days.

(21) Appl. No.: 16/409,928

(22) Filed: May 13, 2019

(65) Prior Publication Data
US 2019/0353247 A1    Nov. 21, 2019

(30) Foreign Application Priority Data
May 15, 2018  (EP) ..................................... 18172505

(51) Int. Cl.
*F16H 63/34*    (2006.01)
*B60T 1/00*     (2006.01)

(52) U.S. Cl.
CPC .......... *F16H 63/3416* (2013.01); *B60T 1/005* (2013.01); *F16H 63/3425* (2013.01); *F16H 63/3475* (2013.01)

(58) Field of Classification Search
CPC ................... F16H 63/3416–3491; B60T 1/005
See application file for complete search history.

(56) References Cited

U.S. PATENT DOCUMENTS

| 3,023,631 | A | | 3/1962 | Curtis |
| 3,386,532 | A | | 6/1968 | Moss |
| 5,052,245 | A | * | 10/1991 | Kigoshi ................. F16H 63/34 |
| | | | | 74/665 T |
| 5,893,439 | A | | 4/1999 | Hoon |
| 6,367,589 | B1 | | 4/2002 | Lausch et al. |
| 8,925,706 | B2 | * | 1/2015 | Rhoades ................. B60T 1/005 |
| | | | | 192/219.5 |
| 10,724,634 | B2 | * | 7/2020 | List ..................... F16H 63/3425 |

(Continued)

FOREIGN PATENT DOCUMENTS

CN          1705841 A      12/2005
CN        202812173 U       3/2013

(Continued)

OTHER PUBLICATIONS

Oct. 19, 2018 European Search Report issue on International Application No. EP18172505.

(Continued)

*Primary Examiner* — Ernesto A Suarez
*Assistant Examiner* — James J Taylor, II
(74) *Attorney, Agent, or Firm* — Clements Bernard Walker; Christopher L. Bernard

(57) ABSTRACT

A park lock arrangement for a vehicle, including a park pawl, an actuating means, and a return spring, where the park pawl is arranged to be in either a release position or in a lock position, wherein the park pawl is longitudinal and includes a body having a lock end and an actuation end, where the park pawl is arranged to slide between the release position and the lock position. The advantage of the invention is that a compact and cost-effective park lock arrangement with is provided.

10 Claims, 5 Drawing Sheets

(56) References Cited

U.S. PATENT DOCUMENTS

| | | | | |
|---|---|---|---|---|
| 2002/0084162 A1* | 7/2002 | Schafer | ............... | G05G 1/30 |
| | | | | 192/13 A |
| 2006/0163024 A1* | 7/2006 | Yamamoto | ............. | B60T 1/062 |
| | | | | 192/219.4 |
| 2010/0193319 A1 | 8/2010 | Stutzer et al. | | |
| 2015/0025750 A1 | 1/2015 | Weslati et al. | | |
| 2016/0025214 A1 | 1/2016 | Yoshida | | |
| 2019/0277401 A1* | 9/2019 | Nofzinger | ........... | F16H 63/3433 |

FOREIGN PATENT DOCUMENTS

| | | | | | |
|---|---|---|---|---|---|
| DE | 19643812 | A1 | | 5/1998 | |
| DE | 10105637 | A1 | * | 8/2002 | ......... F16H 63/3475 |
| DE | 102010053505 | A1 | * | 6/2012 | ......... F16H 63/3491 |
| DE | 102016201177 | A1 | | 7/2017 | |
| FR | 2956180 | A1 | * | 8/2011 | ......... F16H 63/3416 |
| GB | 2485907 | A | | 5/2012 | |
| KR | 20030053997 | A | | 7/2003 | |
| KR | 20070045584 | A | | 5/2007 | |

OTHER PUBLICATIONS

Office action and search report issued in the corresponding CN application No. 201910378900.2.

Second office action and search report issued in the corresponding CN application No. 201910378900.2.

\* cited by examiner

PARK LOCK ARRANGEMENT AND VEHICLE COMPRISING SUCH A PARK LOCK ARRANGEMENT

CROSS-REFERENCE TO RELATED APPLICATION

The present disclosure claims the benefit of priority of co-pending European Patent Application No. 18172505.2, filed on May 15, 2018, and entitled "PARK LOCK ARRANGEMENT AND VEHICLE COMPRISING SUCH A PARK LOCK ARRANGEMENT," the contents of which are incorporated in full by reference herein for all purposes.

TECHNICAL FIELD

The present invention relates to a park lock arrangement for a vehicle and a vehicle including such a park lock arrangement. The park lock arrangement includes a slideable park pawl adapted to slide between a release position to a lock position.

BACKGROUND

Vehicles having an automatic transmission, or electric vehicles that do not have a gearbox, are provided with a park lock function adapted to lock the output shaft of the automatic transmission or the output shaft of the electric motor, which restricts the vehicle from moving in any direction. A parking pawl prevents the transmission from rotating, and therefore the vehicle from moving. The parking pawl locks the transmission's output shaft to the transmission casing or the output shaft of the electric motor by engaging a pawl (a pin) that engages with a parking gear (a notched wheel) arranged on the output shaft, stopping it (and thus the driven wheels) from rotating. The parking pawl will lock the shaft when it extends down between two teeth of the parking gear. The parking gear may also be mounted in other positions, as long as it will be able to prevent the wheels of the vehicle to rotate.

The parking pawl is prevented from being engaged during driving or when the vehicle is moving. On a vehicle having an automatic transmission, this is done by blocking the gear selector until a safe engagement speed for the vehicle is reached. Software may also be used to control that this condition is avoided and that the pawl can only be engaged when the vehicle has come to a standstill.

The actuating means for the parking pawl is normally provided with a spring that will push the parking pawl towards the parking gear. If the vehicle stands still and the parking pawl bears on the top surface of a tooth, the parking pawl will be pushed against the top surface of the tooth. Should the vehicle move slightly, the parking pawl will be pushed down between the teeth by the spring and will lock the output shaft. With this solution, it is not important that the parking pawl extends down between the teeth directly when it is engaged.

A park lock arrangement will normally include a longitudinally extended parking pawl which pivots around a pivot pin. The locking tooth of the parking pawl is arranged at one end of the parking pawl, at the opposite side from the pivot axis. An actuator device will pivot the parking pawl towards the parking gear. The actuator device normally includes a conical bushing that will pivot the parking pawl towards the parking wheel.

US 2015/025750 A, US 2016/025214 A and US 2010/193319 A all disclose such park lock arrangements. Such park lock arrangements normally functions relatively well, but are relatively large and heavy. There is thus room for improvements.

SUMMARY

An object of the invention is therefore to provide an improved park lock arrangement for a vehicle. A further object of the invention is to provide a vehicle including such a park lock arrangement.

In a park lock arrangement for a vehicle, including a park pawl, an actuating means, and a return spring, where the park pawl is arranged to be in either a release position or in a lock position, the object of the invention is achieved in that the park pawl is longitudinal and includes a body having a lock end and an actuation end, where the park pawl is arranged to slide between the release position and the lock position.

By this first embodiment of a park lock arrangement according to the invention, a compact and light-weight park lock arrangement is provided, where the park pawl of the park lock arrangement can slide from a release position to a lock position in a radial direction with respect to the park gear. By allowing the park pawl to slide instead of pivoting around a pivot axis, the park pawl can be made smaller and lighter. The complete park lock arrangement can thus be made smaller and a more compact installation can be obtained.

In one development, the park pawl is suspended in a bushing surrounding the park pawl. The bushing is preferably made in a metal, e.g. steel. Since the transmission housing is made from aluminium or an aluminium alloy and the park pawl is preferably made from another material, e.g. steel, it is of advantage to use a bushing with the same properties as the park pawl. This will reduce the risk of galvanic corrosion between the transmission housing and the park pawl. The bushing must also be able to withstand the forces acting on the bushing from the park pawl and the parking gear. This force may be substantial, e.g. when the vehicle is parked in a downhill or uphill slope.

In one development, the actuating means of the park lock arrangement is asymmetric, and in one example the cross section is rectangular. The use of a rectangular actuating means will allow for a more compact solution, and will further increase the bearing surface between the park pawl and the actuating means. With this solution, the bearing surface of the actuating means can be flat, and the bearing surface of the park pawl can also be flat.

In one development, the short sides of the park pawl are slightly convex. The friction between the park pawl and the bushing is reduced by letting one surface be convex. Since the bushing is tube shaped, and the park pawl is e.g. forged, it is easier to modify the side surfaces of the park pawl. The convex shape will also allow the park pawl to tilt somewhat in the bushing, which will distribute the force on a larger surface.

In one development, the short sides of the park pawl are slightly concave. Since the bushing is tube shaped, and the park pawl is e.g. forged, it is easier to modify the side surfaces of the park pawl. A concave shape will allow oil to enter between the park pawl and the bushing which will improve the lubrication of the park pawl.

In one development, the edges of the lock end of the park pawl are inclined. The inclination will allow the park pawl to easier enter between two teeth of the parking gear. The amount of inclination preferably corresponds to the mesh angle of the parking gear. The face or flank angle of the parking gear teeth are often relatively straight, and the inclination of the edges of the park pawl will thus be dependent on the number of teeth and the face angle of the teeth.

In one development, the edges of the actuation end of the park pawl are inclined. The inclination will allow the actuating means to easier slide against the actuation end between the lock position and the release position. The actuating means is provided with an inclined surface between the bearing surface of the release section and the bearing surface of the lock section. The inclination of the edges of the actuation end preferably corresponds to the inclination of the inclination surface of the actuating means.

In one development, the park lock arrangement includes a support roller, adapted to support the actuating means. The support roller will bear against the upper bearing surface of the actuating means, and will provide a support when pushing the park pawl to the lock position. The support roller will also bear against the actuating means when the park pawl is in the release position, where the actuating means is pushed towards the support roller by the return spring of the park lock arrangement. The support roller must be able to withstand the radial force acting on the support roller from the park pawl and the parking gear when the vehicle is parked in a slope. Since the system is adapted to be self-opening, i.e. the park pawl will exit the parking gear when the actuating means is removed from the park pawl, there is a radial force acting on the support roller.

BRIEF DESCRIPTION OF DRAWINGS

The invention will be described in greater detail in the following, with reference to the attached drawings, in which.

DESCRIPTION OF EMBODIMENTS

The embodiments of the invention with further developments described in the following are to be regarded only as examples and are in no way to limit the scope of the protection provided by the patent claims.

Figure 3:
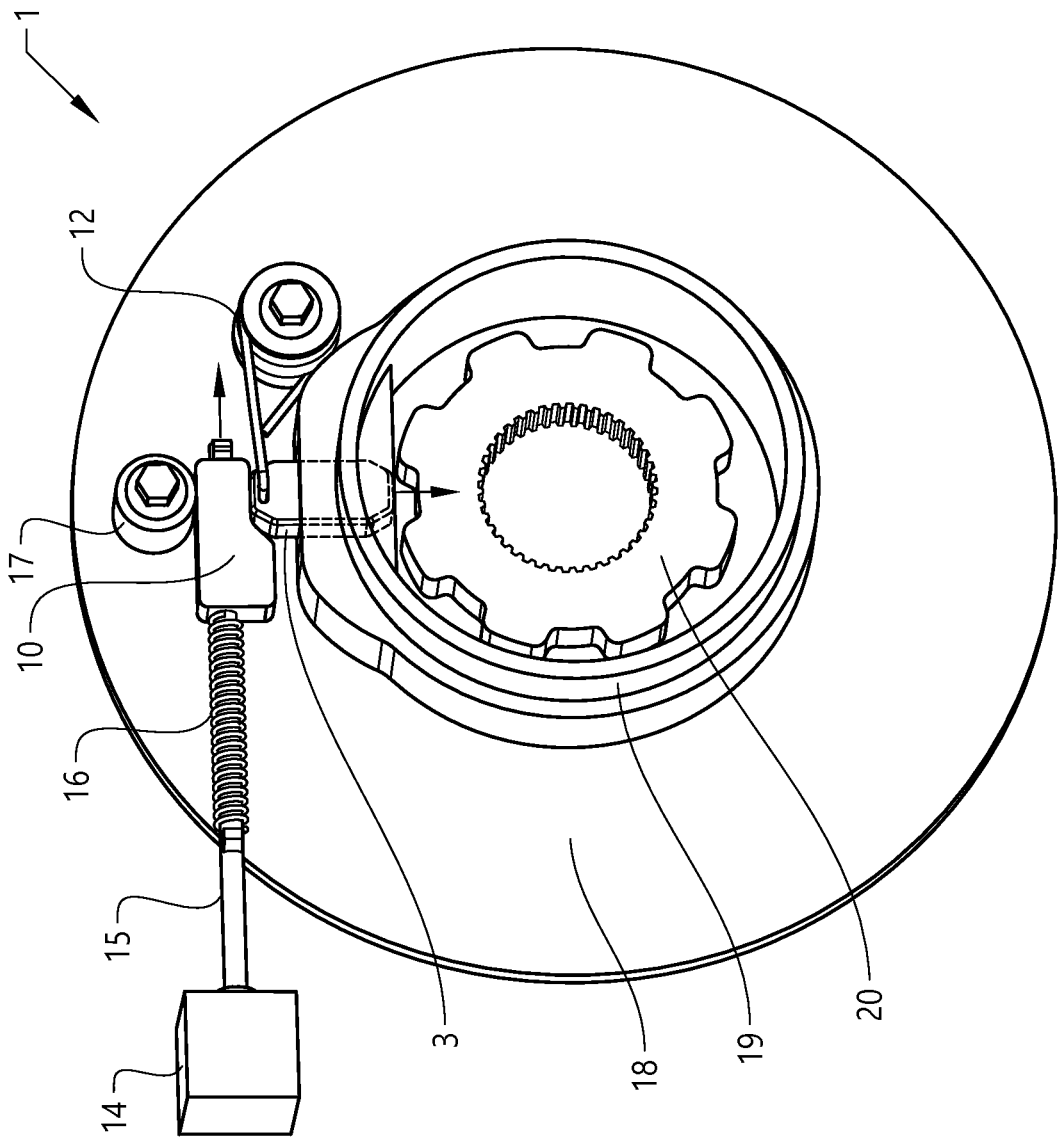
FIG. 3 shows a park lock arrangement according to the invention in a release position.
Figure 4:
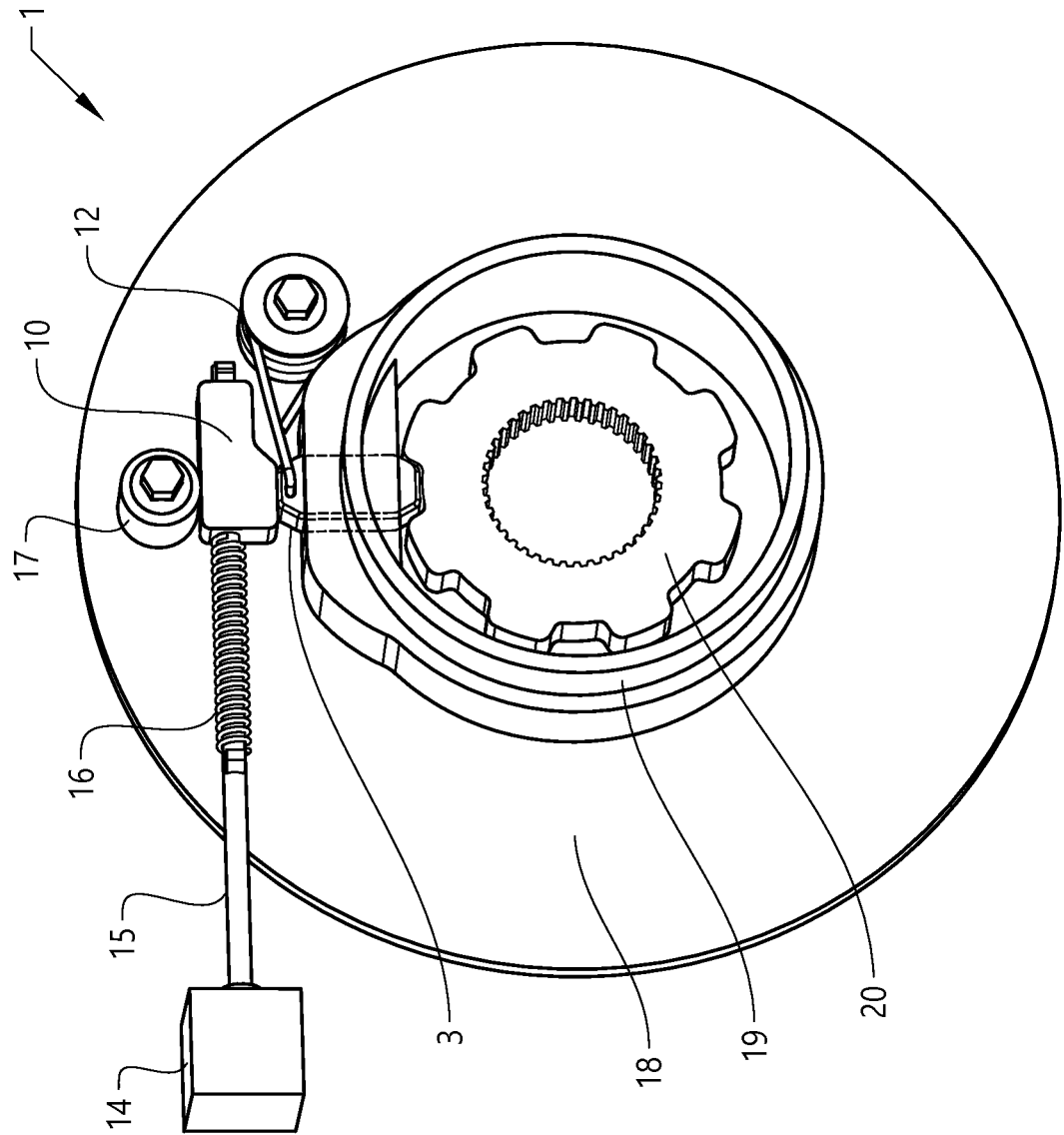
FIG. 4 shows a park lock arrangement according to the invention in a lock position.
Figure 5:
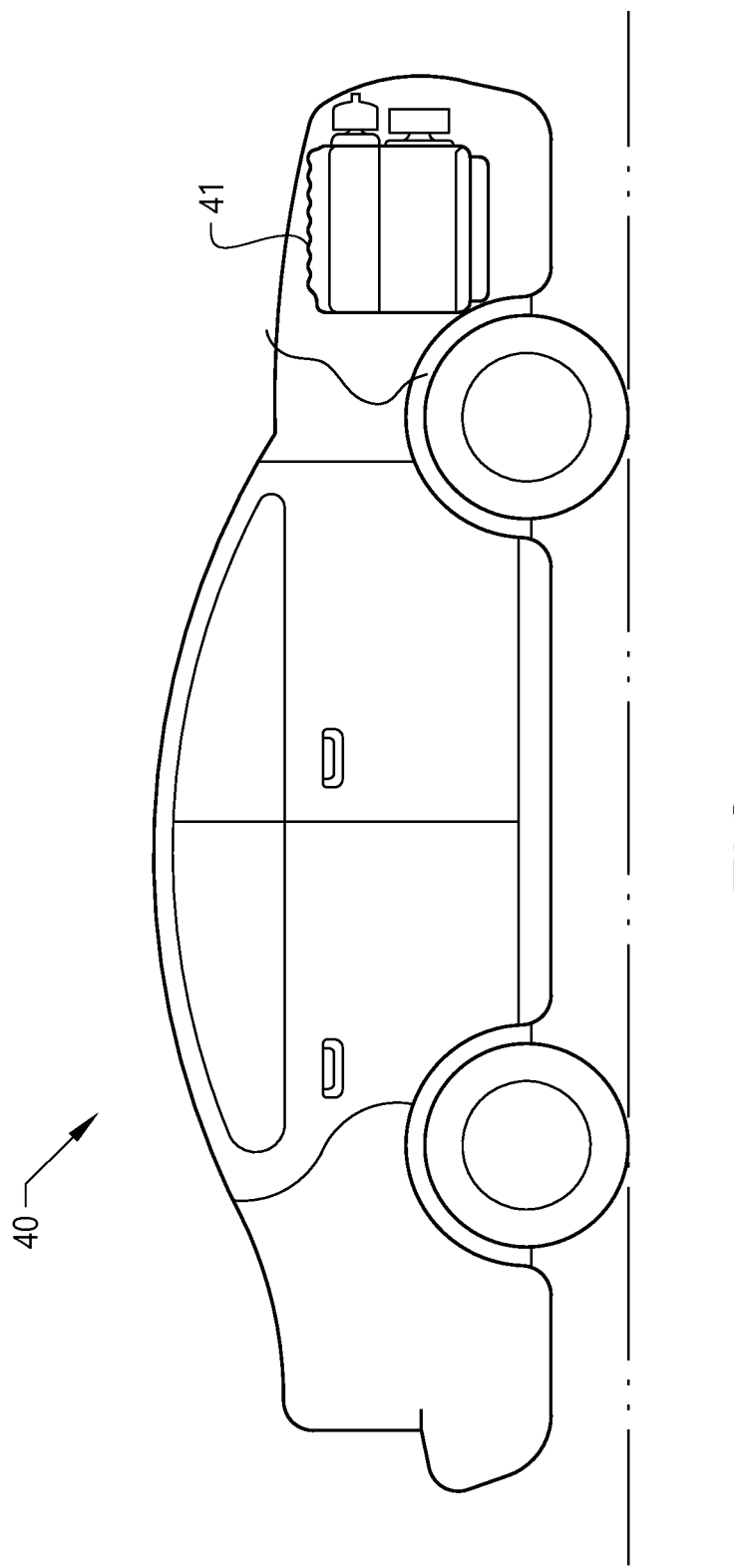
FIG. 5 shows a vehicle including a park lock arrangement according to the invention.

FIGS. 1 to 4 show an inventive park lock arrangement, and FIG. 5 shows a vehicle including such a park lock arrangement.

The park lock arrangement includes a park pawl 2, an actuating means 7, and a return spring 12. The park pawl is arranged to be in either a release position, as is shown in FIG. 3, in which the parking gear is free to rotate or in a lock position, as is shown in FIG. 4, in which the parking gear is locked. The park pawl 2 is adapted to slide between the release position and the lock position. In the shown example, the park pawl is longitudinal with a rectangular cross-section. The park pawl includes a body 3 having a lock end 4 and an actuation end 5. The short sides 21 of the body are adapted to interact with the bushing, transferring the force acting on the park pawl to the transmission housing. The long sides 22 of the park pawl body are adapted to be arranged in parallel with the parking gear. The long sides 22 of the park pawl body may also be slightly convex.

The lock end 4 is adapted to interact with the teeth of the parking gear 20, and is provided with inclined bearing surfaces on the short sides 21 of the edges, a first lock bearing surface 27 and a second lock bearing surface 28. The first lock bearing surface 27 is adapted to block the parking gear from rotation in one direction, and the second lock bearing surface 28 is adapted to block the parking gear from rotation in the other direction. The inclination will allow the park pawl to easier enter between two teeth of the parking gear. In the shown example, the angle of a lock bearing surface is 30 degrees with respect to the centre axis 32 of the park pawl 2, but other inclination angles are also possible. A lock bearing surface must provide a secure locking of the parking gear. The inclination angle is preferably relatively acute, such that the park pawl will be able to hold the parking gear without deformation. The lock end 4 is also provided with a lock end bearing surface 23, which is adapted to bear against the top land of a tooth of the parking gear. The inclination of the lock bearing surfaces of the park pawl is also important in order to provide a park pawl that is self-opening, i.e. the park pawl will exit the parking gear when the holding support for the park pawl in the lock position is removed from the park pawl. The angle between the lock end 4 of the park pawl and the teeth of the parking gear must thus allow the park pawl to be pushed away from the parking gear.

The actuation end 5 is adapted to interact with the actuating means 7. The actuation end 5 of the park pawl 2 is provided with inclined actuation bearing surfaces, a first actuation bearing surface 25 and a second actuation bearing surface 26. The inclination will allow the actuating means 7 to easier slide against the actuation end 5 between the release position and the lock position. The actuation end 5 is also provided with an actuation end bearing surface 24, which is adapted to bear against the actuating means 7. The actuating means 7 is provided with an inclined surface 11 between the bearing surface 31 of the release section 9 and the bearing surface 30 of the lock section 10.

The bearing surface 30 of the lock section 10 is preferably substantially perpendicular to the centre axis 32 of the park pawl. The force acting on the park pawl when the vehicle is parked is transferred from the bearing surface 24 of the actuation end to the bearing surface 30 of the lock section 10 of the actuating means 7. These surfaces must thus correspond to each other and should be parallel to each other. The bearing surface 31 of the release section 9 must only take up the force from the return spring when the park pawl is in the release position, and is not critical. In the shown example, the bearing surface 31 is also parallel to the bearing surface 24 of the actuation end of the park pawl 2. In the shown example, only the first actuation bearing surface 25 is used to slide against the inclined surface 11 of the actuating means 7, but it is of advantage to let the parking pawl be symmetric.

The park pawl is preferably made from a metal, and may e.g. be made of forged steel or sintered steel. It is important that the park pawl can withstand the forces from the parking gear when the vehicle is parked in a slope. The parking gear is also made of steel.

In the shown example, the park pawl 2 is suspended in a bushing 6 surrounding the park pawl. The bushing is mounted in a wall 19 of the transmission housing 18, which is made from aluminium or an aluminium alloy. The bushing is preferably made of steel or a metal alloy. It is of advantage to use a bushing with the same properties as the park pawl.

The use of a bushing will reduce the risk of galvanic corrosion between the transmission housing and the park pawl, especially when they are made from different materials. The bushing must also be able to withstand the force acting on the bushing from the park pawl and the parking gear. This force may be substantial, e.g. when the vehicle is parked in a downhill or uphill slope. The inner walls of the bushing are preferably straight and parallel.

The short sides 21 of the body 3 of the park pawl 2 are in the shown example straight. This will allow the park pawl to slide easily in the bushing 6. It is however possible to let the short sides be slightly convex or concave, depending on the design and mechanical properties of the park pawl. By letting the short sides 21 be slightly convex, the friction between the park pawl and the bushing may be reduced. The convex shape will allow the park pawl to tilt somewhat in the bushing, which will distribute the force on a larger surface.

By letting the short sides 21 of the park pawl 2 be slightly concave, the friction between the park pawl and the bushing may also be reduced. A concave shape will allow oil to enter between the park pawl and the bushing which will improve the lubrication of the park pawl.

A return spring 12 is arranged at the transmission housing 18. One end of the return spring bears on the transmission housing, and the other end is arranged in an opening 13 in the actuating end 5 of the park pawl. The return spring is arranged to push the park pawl towards the release position, such that the park pawl will be pushed away from the lock position regardless of the mounting position of the park pawl on the transmission housing. In the shown example, the park lock arrangement 1 is arranged at the top of the transmission housing, such that the park pawl is pushed upwards by the return spring. In the shown example, the return spring is a wound coil spring. Other types of springs are also possible to use, depending e.g. on the available space.

The park lock arrangement includes an actuating means 7 which is arranged to interact with the park pawl 2. The actuating means is adapted to move between a first position in which it allows the park pawl 2 to be in a release position, to a second position in which it forces the park pawl to the lock position. The actuating means 7 is arranged on an actuator rod 15 which runs through a longitudinal hole through the actuating means. The actuating means is able to slide on the actuator rod and is pushed to the end of the actuator rod 15 by an actuator spring 16. The actuator rod is controlled by an actuator 14, which may be e.g. an electromagnetic solenoid or a rotating motor. The actuator is controlled by the control system of the vehicle, and is activated when the transmission shift selector is placed in the park position, or when an electric vehicle is parked.

The actuating means 7 of the park lock arrangement is asymmetric, and is in the shown example provided with a rectangular cross section, having parallel side walls 33. The use of a rectangular actuating means will allow for a more compact solution, and will further increase the bearing surface between the park pawl and the actuating means. With this solution, the bearing surfaces 30, 31 of the actuating means can be flat, and the bearing surface 24 of the park pawl can also be flat. The thickness of the actuating means 7 may be the same as the thickness of the park pawl 2, i.e. correspond to the width of the short sides of the park pawl. The side walls may be supported in a sideway direction by support surfaces or rollers, or the actuator rod may be supported in a sideway manner, such that the actuating means moves along a straight line.

Figure 1:
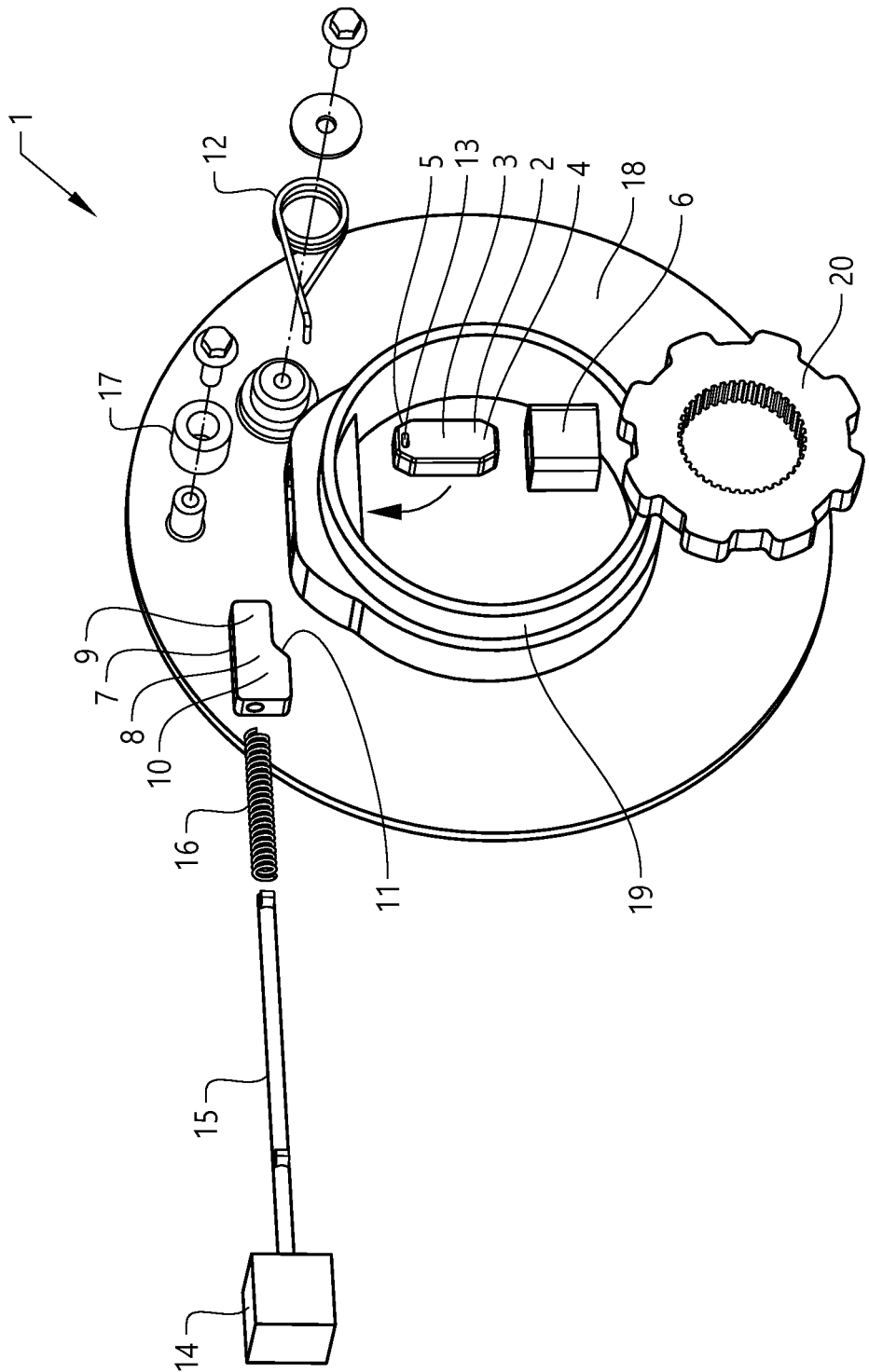
FIG. 1 shows an exploded view of a park lock arrangement according to the invention.
Figure 2:
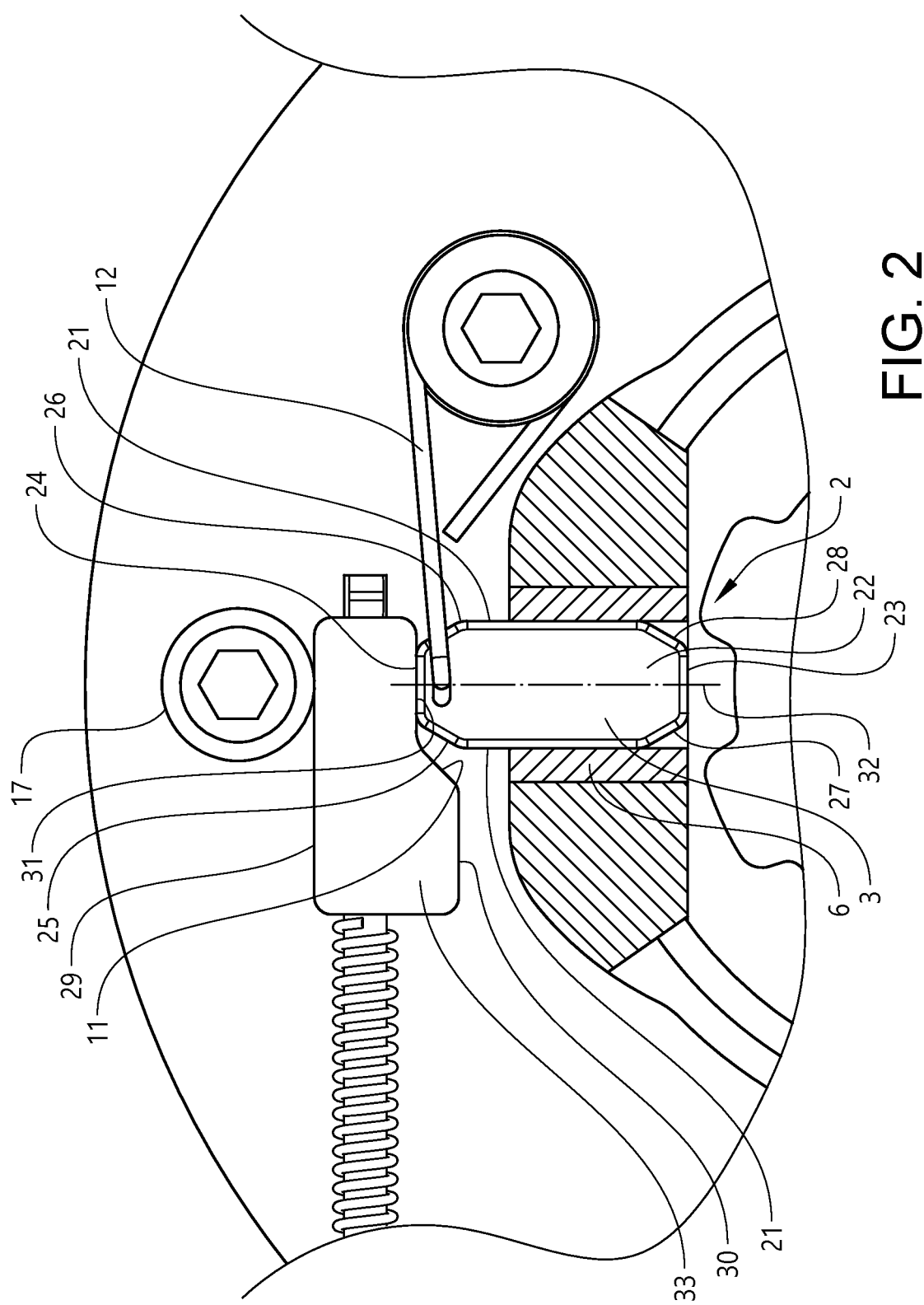
FIG. 2 shows a detail of the park lock arrangement according to the invention.

The park lock arrangement 1 further includes a support roller 17 arranged at the transmission housing 18. The support roller is adapted to support the park pawl 2 through the actuating means 7 and will take up the, in the shown example, vertical force acting on the park pawl when the park pawl is in the lock position. The support roller 17 will bear against the upper bearing surface 29 of the actuating means 7, and will provide a support when pushing the park pawl to the lock position. The support roller will also bear against the actuating means when the park pawl is in the release position, where the actuating means 7 is pushed towards the support roller 17 by the return spring 12 of the park lock arrangement. This is shown in FIG. 2.

When the actuating means is moved from the release position to the lock position, the inclined surface 11 will come in contact with the first actuation bearing surface 25 of the actuation end 5 of the actuating means 7. If the park pawl is positioned such that it is directly between two teeth of the parking gear, the inclined surface 11 will push the park pawl down between the teeth and the actuating means 7 will move to the lock position, where the lock section bearing surface 30 of the lock section 10 bears against the actuation end bearing surface 24 of the actuation end 5 of the park pawl 2. This is shown in FIG. 4. The actuator spring 16 will push the actuating means from the release position to the lock position when the actuator is controlled to lock the park lock arrangement 1. The spring force of the actuator spring 16 will overcome the force of the return spring 12 and the friction of the park pawl.

If the actuating means is moved from the release position to the lock position and the park pawl is positioned such that the lock end bearing surface 23 of the lock end 4 will bear on the top land of a tooth of the parking gear, the park pawl cannot be pushed down between the teeth of the parking gear. The park pawl will be pushed down somewhat, and the inclined surface 11 of the actuating means 7 will bear on the inclined first actuation bearing surface 25 of the actuation end 5 of the park pawl. The actuator spring will be compressed, and the actuator rod will partly slide through the opening in the actuating means. If the vehicle moves slightly, the parking gear will rotate some degrees such that the park pawl will be pushed down between the teeth of the parking gear by the actuating means. The inclined surface 11 will push the park pawl down and the lock section bearing surface 30 of the lock section 10 will bear on the park pawl. The actuating means 7 will at the same time move to the lock position by the actuator spring 16.

FIG. 4 shows a vehicle 40 including an internal combustion engine 41 having an automatic transmission including a park lock arrangement 1 according to the invention. The vehicle may also include an electric motor including a park lock arrangement 1. The park lock arrangement is in the shown example arranged at the output shaft of the transmission or the electric motor, such that it can block the output shaft from rotation. The park lock arrangement may also be positioned in other positions of the drivetrain, as long as the park lock arrangement can prevent the output shaft to rotate.

The invention is not to be regarded as being limited to the embodiments described above, a number of additional variants and modifications being possible within the scope of the subsequent patent claims.

The invention claimed is:

1. A park lock arrangement for a vehicle, comprising a park pawl, an actuating means, and a return spring, where the park pawl is arranged to be in either a release position or in a lock position, wherein the park pawl is longitudinal and comprises a body having a lock end provided with a lock end bearing surface adapted to bear against a parking gear and an actuation end provided with an actuation end bearing surface adapted to bear against a release section of the actuating means in the release position, where the park pawl is arranged to slide in a bushing between the release position and the lock position, short sides of the park pawl that are slidable against the bushing being concave or convex, the actuating means being arranged on an actuator rod that runs through a longitudinal hole through the actuating means, wherein an outer upper bearing surface of the actuating means is parallel to a bearing surface of a lock section of the actuating means, and wherein the park lock arrangement comprises a support roller arranged to bear against the outer upper bearing surface of the actuating means.

2. The park lock arrangement according to claim 1, wherein the lock section of the actuating means is adapted to bear against the actuation end of the park pawl in the lock position.

3. The park lock arrangement according to claim 1, wherein the park lock arrangement comprises the bushing arranged around the park pawl.

4. The park lock arrangement according to claim 1, wherein a cross section of the body of the park pawl is rectangular.

5. The park lock arrangement according to claim 1, wherein a first lock bearing surface and a second lock bearing surface of the lock end of the park pawl are inclined.

6. The park lock arrangement according to claim 1, wherein at least one actuation bearing surface of the actuation end of the park pawl is inclined.

7. The park lock arrangement according to claim 1, wherein side walls of a body of the actuating means are parallel.

8. The park lock arrangement according to claim 1, wherein the actuating means comprises an inclined surface between a bearing surface of the release section and the bearing surface of the lock section.

9. The park lock arrangement according to claim 1, wherein the actuating means is adapted to perform a straight movement when it pushes the park pawl from the release position to the lock position.

10. A vehicle comprising the park lock arrangement according to claim 1.

* * * * *